United States Patent [19]
Jeunehomme et al.

[11] 3,971,943
[45] July 27, 1976

[54] ULTRAVIOLET RADIATION MONITOR

[75] Inventors: Michel L. Jeunehomme, Novi; Robert A. Essad, Sterling Heights, both of Mich.

[73] Assignee: The Bendix Corporation, Southfield, Mich.

[22] Filed: Feb. 4, 1975

[21] Appl. No.: 546,855

[52] U.S. Cl. ............................................. 250/372
[51] Int. Cl.² ........................................... G01J 1/42
[58] Field of Search .......... 250/372, 336, 374, 388; 356/51

[56] References Cited
UNITED STATES PATENTS

| | | | |
|---|---|---|---|
| 3,553,665 | 1/1971 | Trumble | 250/372 X |
| 3,851,970 | 12/1974 | Adler et al. | 250/372 X |

OTHER PUBLICATIONS
Nuclear Reactor Engineering, Glasstone et al., D. Van Nostrand Co., 1967, chapter 9.90, Fig. 9.6, pp. 538–539.

*Primary Examiner*—Davis L. Willis
*Attorney, Agent, or Firm*—W. G. Christoforo; Bruce L. Lamb

[57] ABSTRACT

A readily portable ultraviolet radiation monitor includes an ultraviolet radiation sensitive cell or transducer arranged in an electrical circuit to drive a digital voltmeter. The ultraviolet sensitive transducer includes a solar blind vacuum photodiode which is exposed to the area of interest through various ultraviolet filters to produce a desired predetermined transducer response characteristic. The monitor is generally T-shaped with the transducer located to view out of one arm of the T, while the meter display is viewed into the other arm. A dependent handle comprises the leg of the T.

21 Claims, 5 Drawing Figures

3,971,943

ULTRAVIOLET RADIATION MONITOR

BACKGROUND OF THE INVENTION

This invention relates to ultraviolet (UV) radiation monitors, particularly to such monitors which are adapted to field use and, hence, are readily portable and rapid acting.

A recommended UV radiation exposure standard has recently been developed and published by the American Conference for Governmental Industrial Hygenists. The standard is in the form of a curve of maximum energy density v. wavelength and is seen in FIG. 1 which will be described in detail below. The standard represents a rather arbitrary average of a number of conflicting data, covering the short and long term effect of UV exposure on the eyes and various parts of the body.

Time after irradiation is a very important parameter and so is the level of skin reaction considered. The most recent data concern skin reaction at trunk locations and describe the energy requirement of the minimum perceptible erythema. These data correlate satisfactorily with the action spectrum of photokeratitis, supporting a common standard about skin erythema and photokeratitis. The standard was established to be generally below the action thresholds published at various wavelengths. Although it is possible to find data supporting a number of curves differing very significantly from the proposed standards, the latter represents a valuable guide and the maximum energy densities proposed at each wavelength are likely to be safe for all but especially photosensitive individuals.

The principal advantages of the standard are that the standard is a compromise between short and long term effects, different sensitivities of different parts of the body, that it is below the exposure thresholds measured by most investigators, that it is a single spectral curve, eliminating the complexities of multiple standards. As such, the standard is regarded as a guide, or a target with a spectral response within the limitations of real life monitors.

UV monitors for field use have generally been relatively simple instruments using suitable absorbents or filters to insure that mainly radiation within the UV spectrum is effective to excite a suitable photocell. Generally, however, no attempt has been made to shape the characteristic response of the simple UV field monitors to a specific standard. Those UV monitors which have a characteristic response shaped to the aforementioned standard have been heavy and expensive, being complex and difficult to produce, and slow acting. The slow speed of these latter UV monitors together with their relatively inconvenient form have combined to compromise the health and safety of their operators.

SUMMARY OF THE INVENTION

Accordingly, it is an object of this invention to produce a readily portable UV radiation monitor having a characteristic response in accordance with a predetermined standard, and which in addition is relatively light in weight and rapid acting and designed to be convenient in use.

In order to accomplish the aforementioned object of the invention a simple UV radiation sensitive transducer comprised of a solar blind photocell having a characteristic response encompassing the response of the predetermined standard is used. The photocell is permitted to view the area of interest only through suitable absorbers or filters which modify the response characteristic to that desired. Specifically, a chlorine gas filter is used to attenuate the response of the cell in the long UV wavelength region, while a clear polymer film is used to attenuate the response of the cell in the short UV wavelength region.

It is thus another object of this invention to provide an ultraviolet radiation sensitive transducer comprised of a solar blind photocell which is responsive to radiation in the UV spectrum, together with filters to attenuate the response of the photocell in the high and low ranges of the UV spectrum while maintaining a central portion of the cell response characteristic relatively unattenuated.

For convenience in operation the monitor is manufactured in a generally T-shape, the leg of the T comprising a pistol grip handle having a trigger switch for activating the monitor. The handle also suitably encloses batteries for energizing the electrical circuits of the monitor. The main body of the monitor suitably encloses the electrical circuits and comprises a section sitting on top of the handle and generally perpendicular thereto. The main body includes front and rear vertical panels when viewed with the handle down. The radiation sensitive transducer is arranged in the front panel to view outwardly and generally perpendicular therefrom toward the field of interest. A digital display is observable at the rear panel. The rear panel can optionally include a hooded section to protect the operator's eyes from the area of interest. Suitably, the top surface of the monitor mounts further monitor controls.

BRIEF DESCRIPTION OF THE DRAWINGS

In the various figures, like reference numbers refer to similar or identical elements.

DESCRIPTION OF THE PREFERRED EMBODIMENT

Figure 1:
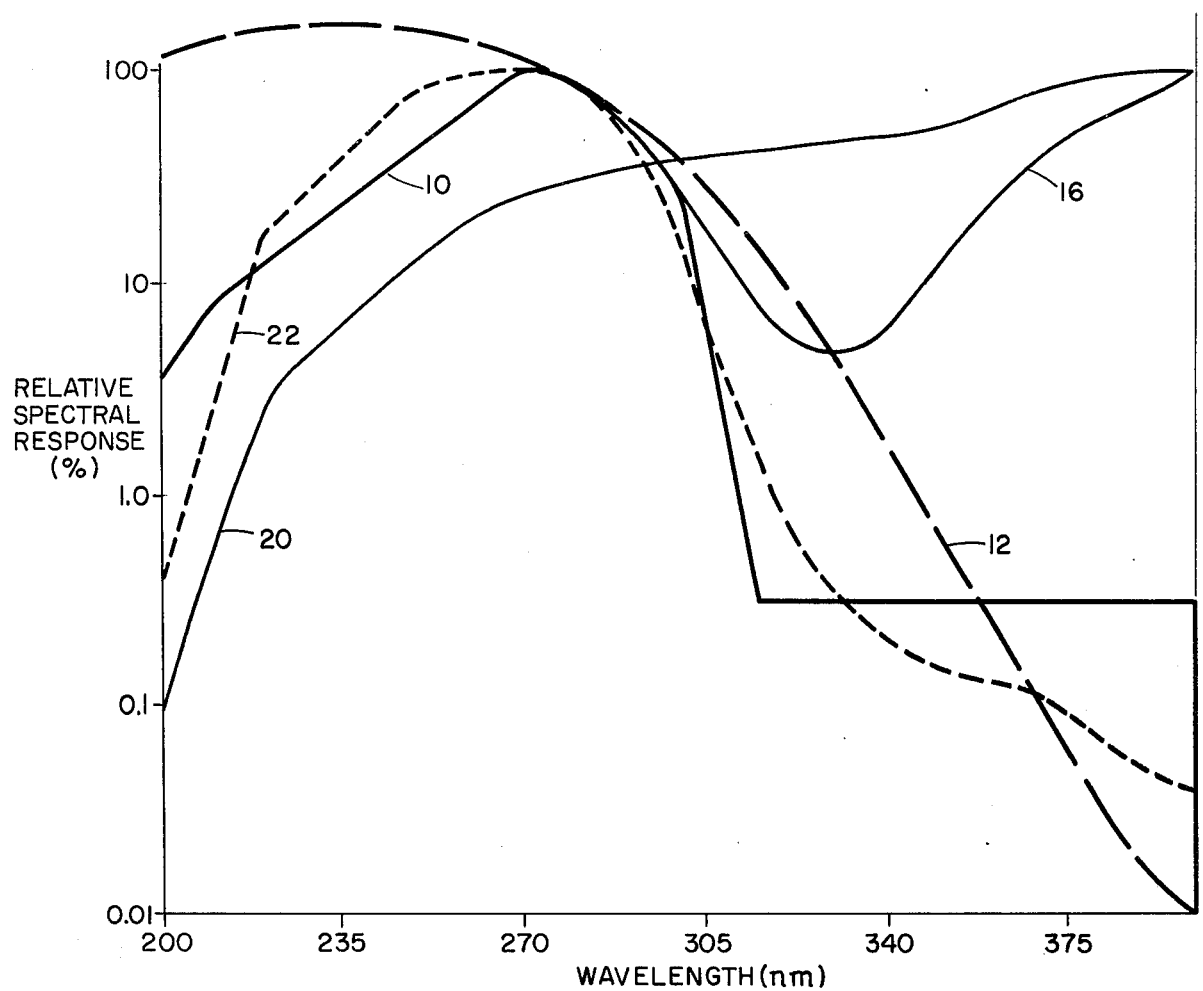
FIG. 1 illustrates curves showing the relative spectral response characteristics of an ultraviolet radiation sensitive transducer built in accordance with the principles of this invention and superimposed on a recommended UV radiation exposure standard characteristic.

Refer to FIG. 1, curves which illustrate the effect of various filters on the spectral response of a solar blind phototube. The curves are drawn to common coordinates where the abscissa represents ultraviolet wavelength in nanometers (nm) and the ordinate represents relative spectral response in percent. It should be noted that the ordinate is logarithmic. Curve 10, in bold line, illustrates the aforementioned standard proposed by the American Conference for Governmental Industrial Hygenists. The standard follows the proposed energy density curve from 200 to 315 nm and then shows a plateau of 1 joule per square centimeter from 315 to 400 nm. Broken line curve 12 illustrates the relative spectral response of a typical commercial vacuum photodiode with a cesium telluride or other solar blind photocathode of the type used in the embodiment of the present invention as will be described below. It can be seen that the relative spectral response of a commercial vacuum photodiode roughly approximates the proposed standard throughout its range with the exception of greatly enhanced response at the lower wavelengths and a slight mismatching at the higher wavelengths.

A suitable UV exposure meter should match the proposed standard more closely that the bare solar blind photodiode. This matching is accomplished according to the teachings of the present invention by providing a number of simple filters which suitably correct for the mismatch at the long wavelength side, the wavelength above 270 nanometers and also for the short wavelength side, that portion of the UV spectrum below 270 nm.

The approach used to compensate the long wavelength side is to use a gas cell filter filled with chlorine gas at a pressure adjusted for best match between the long wavelength side of the sensitivity curve of the solar blind photodiode and the relative spectral response of the combined chlorine cell photodiode. Chlorine cells with optical depth of 0.01 to 0.05 centimeter moles per liter were found to generate a typical curve, such as illustrated as curve 16 and to be suitable as long wavelength side filters.

The approach used to tailor the spectral response of the resultant combination chlorine gas cell and solar blind photodiode of the short wavelength side of the curve, is to add an absorber of very gradual absorption increase with decreasing wavelength over the range of 270 nm to at least 200 nm. Such absorber may be (but is not restricted to) TFE and FEP plastics, silicone grease, RTV and RTV treated substrates. These absorbers show the required gradual absorption increase with decreasing wavelength over the spectral range of interest. In an ultraviolet monitor actually built a 0.030 inch thick layer of silicone grease, which is available from Dow Corning Corporation as Compound 11, was used as the short wavelength side filter. The response of such a filter is typically shown as curve 20 of FIG. 1.

In the UV transducer actually built a photodiode having the response illustrated by curve 12 was exposed to the ultraviolet field of interest through a chlorine gas cell having the relative spectral response of curve 16 and through the 0.030 inch layer of silicone grease mentioned above and having the relative spectral response of curve 20. When curves 12, 16 and 20 are multiplied point by point and the resulting curve normalized so as to read 100 at 270 nm, curve 22 is obtained. It can be seen that curve 22 closely approximates the standard illustrated by curve 10 and UV transducer built as described above will provide the desired UV response very closely.

Figure 2:
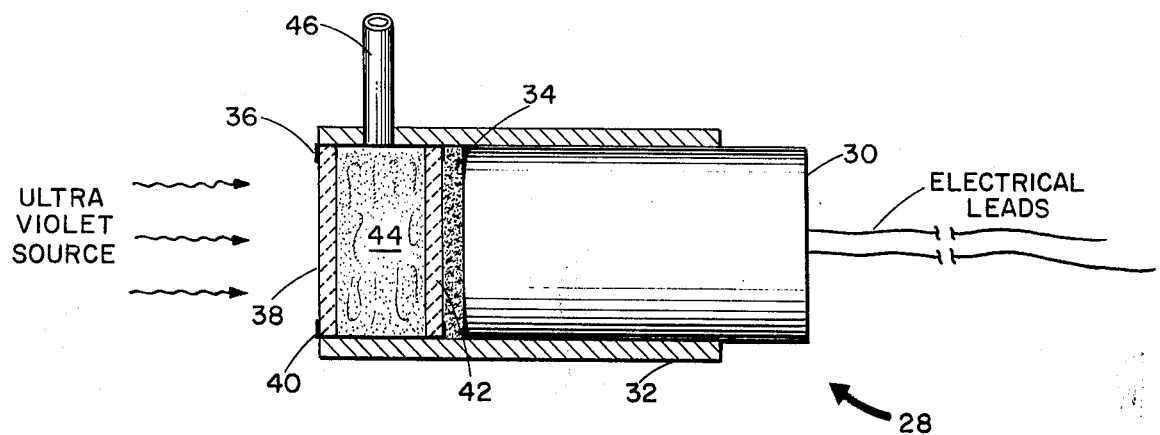
FIG. 2 illustrates in section an ultraviolet radiation sensitive transducer having the response characteristic illustrated in FIG. 1.

A suitable UV transducer 28 is illustrated in FIG. 2, reference to which figure should now be made. The transducer, shown cut away for clarity, is comprised of a commercially available solar blind photodiode, suitably with a cesium telluride photocathode as previously described. The photodiode is seen as item 30 enclosed within a suitable sleeve 32 and having electrical leads at the rear end thereof for communicating the electrical output of the transducer to electrical circuitry to be described. The active face of the photodiode, that is the face of the photodiode to the left in FIG. 2, is coated with or exposed through a suitable short wavelength side filter, which in this embodiment is a 0.030 inch layer of silicone grease designated in the figure as item 34.

A chlorine gas cell 36 is placed within sleeve 32 to contain silicone grease layer 34 against the active face of the photodiode 30. The gas cell is comprised of front and rear quartz windows 38 and 42, respectively, contained in gas tight relationship by cylindrical sleeve 40. Means for charging the gas cell with chlorine gas are well known to those skilled in the art and briefly, can comprise a pinch-off tube 46 through which chlorine gas is introduced into the cell. The tube is then collapsed and folded into or onto sleeve 32.

Ultraviolet radiation is incident from the left side of the figure into the transducer, entering through gas cell 36 via Quartz window 38.

The use of the chlorine gas cell permits the spectral response for each transducer to be individually tailored by the adjustment of the chlorine gas pressure inside the cell. This can be accomplished by assembling the transducer in accordance with FIG. 2 and by then charging the gas cell through pinch-off tube 46 in a manner known to those skilled in the art. Such individual adjustment may not be necessary if photodiodes or other photoresponsive devices having uniform spectral response curves are available and used. However, if photodiodes having less uniformity are used, tailoring of the transducer by means of the chlorine gas pressure as described will result in good uniformity of the various transducers.

Figure 3:
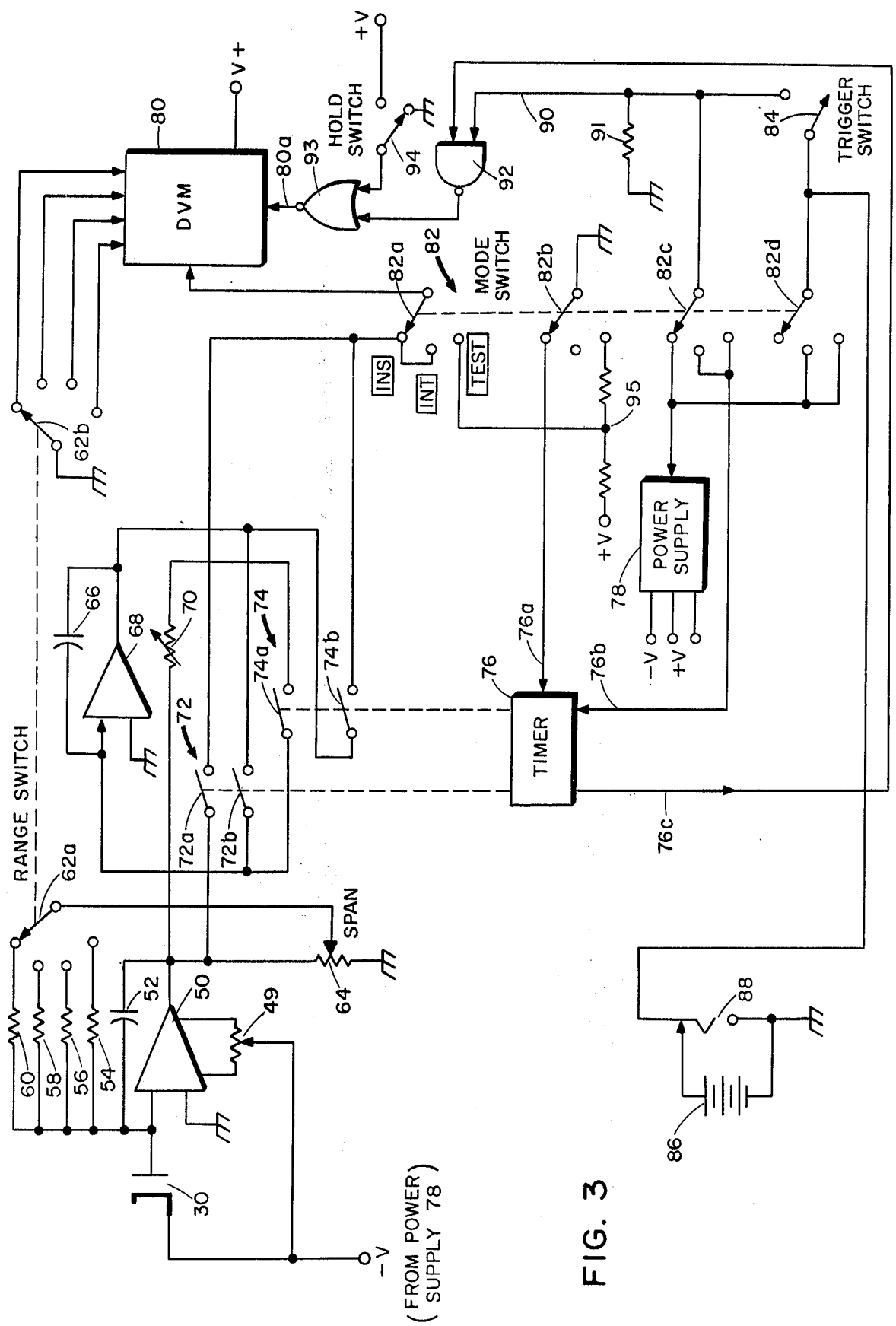
FIG. 3 is a schematic of an electrical circuit useful in practicing this invention.

Photocurrent from the transducer of FIG. 2 is received for display by the electronic circuit whose schematic is seen at FIG. 3, reference to which should now be made. In that figure, photodiode 30 has its cathode connected to a source of negative voltage from power supply 78, more of which will be explained below. The photodiode anode is connected to an operational amplifier 50 whose amplification factor is determined by resistors 54, 56, 58 and 60 which are individually switchable into the amplifier feedback circuit. Amplifier 50 can be zeroed by manipulation of potentiometer 49. A double pole four-throw range switch comprised of pole 62a through which the desired feedback resistor is selected also includes pole 62b which simultaneously selects the appropriate range of a suitable display device or indicator 80 such as a digital voltmeter. A capacitor 52 is connected parallel to the selected feedback resistor of amplifier 50. The purpose of capacitor 52 is to slow down the response of the amplifier, the response time of the amplifier in a monitor actually built being chosen to be about 0.1 second for noise averaging purposes. Switch pole 62a is returned to the output terminal of amplifier 50 through the adjustable resistance of potentiometer 64 whose manipulation adjusts the span of the amplifier output signal.

A timer 76 alternately closes a pair of double pole single throw switches 72 and 74, the first of which is comprised of poles 72a and 72b and the second of which is comprised of poles 74a and 74b.

An integrating amplifier 68 having capacitor 66 in its feedback circuit and a rate resistor 70 is also provided for purposes to be explained below. It is suffice to state at this time that with switch poles 72a and 72b closed and poles 74a and 74b open the output signal from amplifier 50 is applied directly to indicator 80. On the other hand, with poles 72a and 72b open and poles 74a and 74b closed, the output from amplifier 50 is integrated by integrator 68 before it is applied to indicator 80. Whether the instantaneous output of amplifier 50 is applied to indicator 80 or whether it is integrated first is determined by the mode switch 82 comprised of poles 82a, 82b, 82c and 82d. With the mode switch in the "instantaneous" mode, the position shown, terminal 76a of timer 76 is grounded through switch pole 82b. In this condition, the timer when energized, will act to close switch poles 72a and 72b while maintaining switch poles 74a and 74b open. If now trigger switch 84 is closed the positive voltage on its pole from battery 86 or from an external source through external battery jack 88 is applied to line 90 and hence to switch pole 82c. The positive voltage at pole 82c is applied to power supply 78 which suitably includes battery 86 and external battery jack 80, but which are here shown separately for clarity. Power supply 78 suitably comprises a d.c. to d.c. converter which generates the voltage required for the operation of the circuits and, when trigger switch 84 is closed whle switch 82 is in instantaneous mode, applies these to the various devices, including the negative voltage terminal at the cathode of photodiode 30 and the +V voltage terminal of indicator 80 in addition to energizing timer 76. With the timer thus energized and its terminal 76a grounded poles 72a and 72b close thus connecting the output of amplifier 50 through switch poles 72a and 82a directly to indicator 80. The closing of switch pole 72b shunts capacitor 66 for purposes to be explained below.

With trigger switch 84 closed so that line 90 is energized, a signal is applied through NOR gates 92 and 93 to indicator 80. This signal at indicator 80 is required if the indicator is a device such as a digital voltmeter and permits the digital voltmeter to take readings at its normal repetition frequency. If, with trigger switch 84 closed, hold switch 94 is closed, then the last display on indicator 80 will be held until the hold switch is again opened.

Assume now the mode switch is placed in the intermediate position, the integration mode. In this condition, pole 82d applies battery voltage to the power supply 78 thus energizing the various circuits. However, since the ground is removed from terminal 76a of timer 76 the timer does not operate in the same manner in this mode as it did in the first, instantaneous mode. Specifically, in the present mode, terminal 76b of timer 76 is grounded through pole 82c and resistor 91 so long as trigger switch 84 remains open. However, when the trigger switch is closed, a positive voltage is applied from the battery to line 90 and hence through pole 82c to terminal 76b of timer 76. This energizes the timer into a second state. In this second state the timer alternately closes switch poles 74a and 74b for an extended period of time, this time period in the instrument actually built being 10 seconds. During the time that poles 74a and 74b are closed a signal is also applied by the timer on line 76c which is applied to NOR gate 92. Of course, while poles 74a and 74b are closed, poles 72a and 72b are opened, as previously explained. Thus, the output signal from amplifier 50 is applied through resistor 70 and pole 74a to the input terminal of integrator 68, the output terminal of which is connected through pole 74b and pole 82a to indicator 80. At the end of the aforementioned ten second period poles 74a and 74b open momentarily while poles 72a and 72b close momentarily. Capacitor 68 is thus discharged through pole 72b. Immediately thereafter, timer 76 again operates to close poles 74a and 74b and to open poles 72a and 72-b. Thus, in the integration mode, the output from amplifier 50 is integrated over a 10 second period, or other suitable period at the designer's option and displayed on indicator 80. The integration mode of operation is particularly useful when the monitor is used for viewing intermittent UV sources, such as arc welders or flash lamps.

During the integration mode of operation when the trigger switch 84 is released or opened a ground signal is reestablished at terminal 76b of timer 76. In response to this, timer 76 completes its current 10 second period at the termination of which the signal at terminal 76c is terminated. The resultant signal from NOR gate 93 is applied to indicator 80 to hold the reading thereof. Thus, with the integration mode of operation the trigger switch need be depressed only momentarily in order to obtain a reading on indicator 80.

Of course, if in the integration mode, hold switch 94 is closed while trigger switch 84 is closed, the last reading on indicator 80 will be held.

It should now be obvious that timer 76 comprises a simple self-latching device having a 10 second or other period as determined by the system designer. The self-latching device can energize circuits which control switches 72 and 74 in addition to controlling the signals on line 76c. In the instantaneous mode the self-latching device is not used and switches 72 and 74 are controlled directly by the grounding of line 76a.

With the mode switch in the third position, the test mode, the voltage from voltage divider 95 is applied through pole 82a to indicator 80 to accomplish a battery test.

Figure 4:
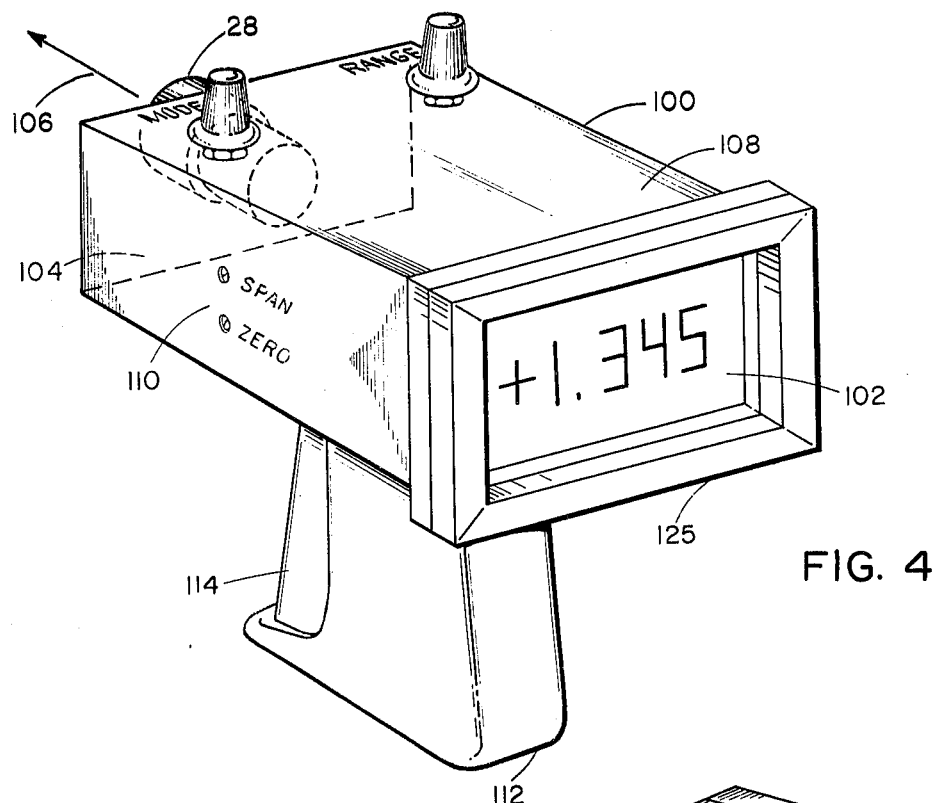
FIG. 4 illustrates the invention as packaged in a novel form.

Refer now to FIG. 4 which shows an oblique view of a suitable form of a portable ultraviolet radiation monitor. The housing is suitably generally T-shaped having a horizontal container 100 which includes a rear panel 102 and a front panel 104, shown in phantom. Transducer 28, explained in detail with respect to FIG. 2, is mounted in front panel 104 so that its active face observes generally in the direction of arrow 106, that is generally perpendicular to panel 104. Back panel 102 has mounted therein the display corresponding to indicator 80 of FIG. 3. In this embodiment, the display is the digital display of a digital voltmeter. An optional radiation hood 125 is seen which shields an operator's eyes from the radiation source while the monitor is in use.

A top panel 108 of container 100 has mounted therein the mode and range switches. Holes in side panel 110 permit screw driver access to the span and zero potentiometers previously described with respect to FIG. 3. A dependent handle 112 provides for ready portability. The handle includes a trigger 114 which operates trigger switch 84 and hold switch 94 of FIG. 3 for convenient operation of the monitor.

Figure 5:
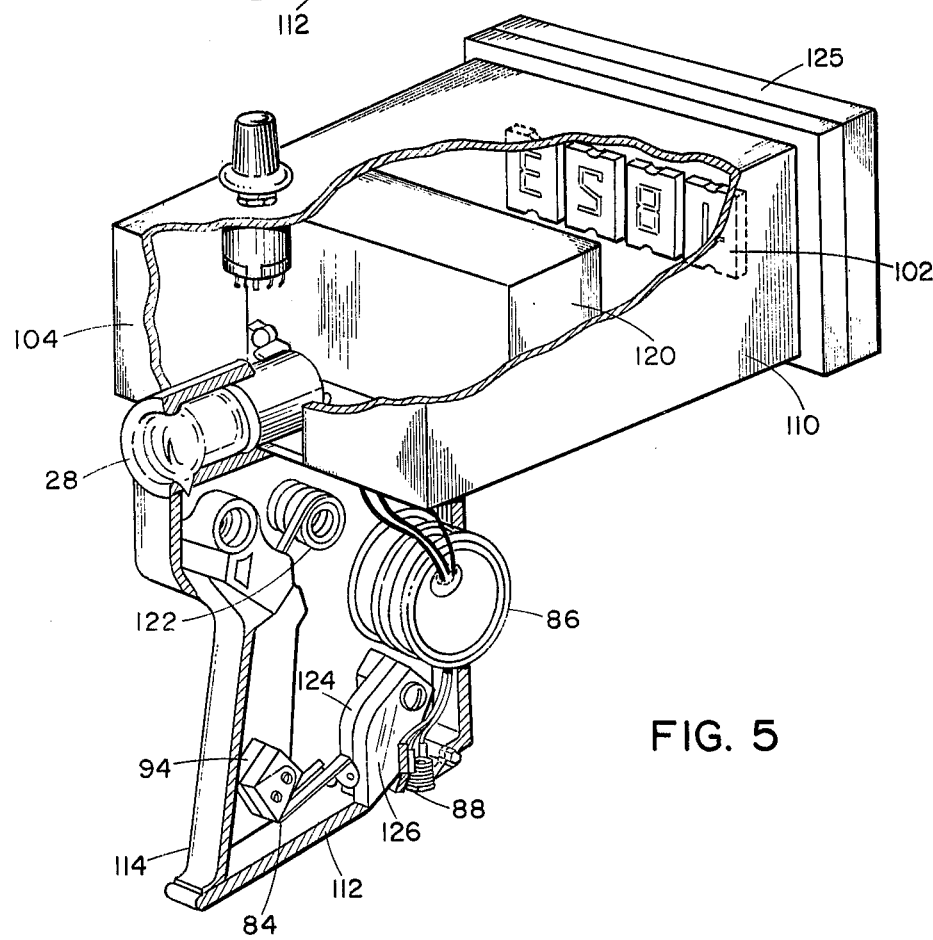
FIG. 5 illustrates the device of FIG. 4 shown cut away for clarity.

The monitor is shown in an oblique front cut away view in FIG. 5, reference to which should now be made. In this figure, a module 120 includes most of the electrical elements seen in FIG. 3 mounted in a manner well known to those skilled in the art. In addition UV transducer 28 is seen mounted in front panel 104. Dependent handle 112 is also shown in cut away detail to include and contain batteries 86 together with external battery jack 88. In addition, trigger switch 84 and hold switch 94 are also seen mounted in the handle and specifically on trigger 114 which is normally biased forward by a spring 122. As the trigger is depressed, switches 84 and 94 are actuated sequentially by cam surfaces 126 and 124. Not shown are two detents cooperating with trigger 114 to provide an operator feel for when switches 84 and 94 are respectively closed. The display of the digital voltmeter is seen mounted in rear panel 102.

Also seen in this figure is radiation hood 125 mounted about the rear panel for shielding the eye of an operator from the ultraviolet source of interest.

In operation, the dependent handle of the monitor is grasped in the hand of the operator so that the active face of transducer 28 is directed toward the area of interest. In this condition, the display on rear panel 102 will be directed toward the operator. With the range and mode switches in their desired positions, a reading can then be made by depressing the trigger as previously described. The hold feature of the monitor permits a reading to be taken and then the monitor removed to a remote location for reading.

It should also be realized that this monitor can be adapted to automatic operation. This is accomplished simply by periodically applying a voltage on line 90 of FIG. 3 and by connecting the signal of switch pole 82a to a recorder. Other alterations and modifications of this invention should now be apparent to one skilled in the art. Accordingly, the invention is to be limited only by the true spirit and scope of the appended claims.

The invention claimed is:

1. An ultraviolet radiation transducer for generating an electrical output signal correlated to the intensity of ultraviolet radiation flux incident thereon, comprising:
   phototransducer means for generating said electrical signal in response to the ultraviolet radiation flux incident thereon, said phototransducer means having a relatively high spectral response in the range of 200 to 270 nanometers of radiation wavelength;
   first optical means for filtering ultraviolet radiation incident on said phototransducer means and having a high relative spectral response to radiation having a wavelength between about 200 and 270 nanometers and having a rapidly decreasing relative spectral response from about 270 nanometers to about 330 nanometers wavelength of radiation; and,
   second optical means for filtering ultraviolet radiation incident on said phototransducer means and having a relative spectral response which is comparatively low for radiation having a wavelength of 200 nanometers, the relative spectral response rapidly increasing as the radiation wavelength increases.

2. The ultraviolet radiation transducer of claim 1 with additionally display means responsive to said electrical signal for producing as indication related to the ultraviolet radiation flux incident on said phototransducer means.

3. The device of claim 1 with additionally an electrical circuit responsive to said electrical signal for normalizing said electrical signal so as to closely match the relative spectral response of said phototransducer means to a predetermined standard.

4. The device of claim 3 including a housing and a handle dependent therefrom and wherein said electrical circuit is switchably energized from an electrical source and including a switch switchably energizing said electrical circuit, said switch comprising a trigger switch mounted in cooperation with said dependent handle for control by an operator.

5. The device of claim 3 wherein said electrical circuit includes an utilization means responsive to the normalized electrical signal for producing an indication related to the ultraviolet radiation flux incident on said phototransducer means.

6. The device of claim 5 wherein said utilization means comprises at least an electrical condition meter.

7. The device of claim 3 wherein said electrical circuit comprises an amplifier for normalizing said electrical signal; an integrator; utilization means; and, means for switchably interposing said integrator between said amplifier and said utilization means whereby said utilization means responds to the normalized electrical signal or to the normalized electrical signal as integrated by said integrator.

8. The device of claim 7 wherein said means for switchably interposing includes means for selecting whether the output of said amplifier is connected directly to said utilization means or through said integrator to said utilization means, and wherein said integrator includes a charge storage circuit, said means for selecting including timer means periodically discharging said charge storage circuit when the output of said amplifier is selected to connect to said utilization means through said integrator.

9. The device of claim 8 wherein said utilization means comprises at least an electrical condition meter.

10. The device of claim 9 wherein said ultraviolet radiation transducer and said electrical circuit are contained in a housing having a dependent handle and a container generally perpendicular thereto, said container having front and rear generally opposed panels, said ultraviolet radiation transducer having an active face for receiving radiation incident thereon, said face being arranged generally parallel to said front panel to view an area of interest out of and forward of said front panel, said electrical condition meter being mounted to be viewed by looking toward said rear panel.

11. The device of claim 10 and including a hood displaced at least around said electrical condition meter for shielding the eyes of an operator from said area of interest.

12. The device of claim 11 wherein said electrical condition meter comprises a digital voltmeter.

13. An ultraviolet radiation transducer for generating an electrical output signal correlated to the ultraviolet radiation flux incident thereon, comprising:
    a solar blind photocell for generating said electrical signal in response to the ultraviolet radiation flux incident thereon;
    a first optical means for filtering ultraviolet radiation incident on said photocell and comprised of chlorine gas for attenuating relatively long ultraviolet wavelengths; and,
    a second optical means for filtering ultraviolet radiation incident on said photocell and comprised of silicone grease for attenuating relatively short ultraviolet wavelengths.

14. The ultraviolet transducer of claim 13 including means for fixedly holding said photocell and first optical means with respect to one another, said silicone grease being contained between said photocell and said first optical means.

15. The ultraviolet transducer of claim 13 wherein said first optical means comprises front and rear quartz windows and means for holding said windows with respect to one another to form a gas tight cell between said windows, said chlorine gas being contained within said gas tight cell.

16. The ultraviolet transducer of claim 15 wherein the pressure of the chlorine gas contained within said gas tight cell is adjusted to produce an optical depth of about 0.01 to 0.05 centimeter moles per liter measured along a line perpendicular to said windows.

17. The ultraviolet transducer of claim 13 wherein said photocell comprises a cesium telluride vacuum photodiode.

18. The ultraviolet transducer of claim 17 wherein said first optical means comprises a chlorine gas cell having an optical depth within the range of about 0.01 to 0.05 centimeter moles per liter.

19. The ultraviolet transducer of claim 18 wherein said second optical means is comprised of a layer of silicone grease about 0.020 inches thick along the direction of propagation of the ultraviolet radiation incident on said photocell.

20. The ultraviolet transducer of claim 17 wherein said second optical means is comprised of a layer of silicone grease about 0.020 inches thick along the direction of propagation of the ultraviolet radiation incident on said photocell.

21. The ultraviolet transducer of claim 20 wherein the pressure of the chlorine gas comprising said first optical means is adjusted to produce a relative spectral response of said transducer which at least approximates a predetermined relative spectral response.

\* \* \* \* \*